United States Patent

[11] 3,621,341

| [72] | Inventor | Eugene H. Lombardi<br>Port Chester, N.Y. |
|---|---|---|
| [21] | Appl. No. | 730,234 |
| [22] | Filed | May 20, 1968 |
| [45] | Patented | Nov. 16, 1971 |
| [73] | Assignee | Ethyl Corporation<br>New York, N.Y. |

[54] CONTROL APPARATUS
9 Claims, 1 Drawing Fig.

[52] U.S. Cl. .................................................. 317/157,
73/35
[51] Int. Cl. .................................................. H01h 9/00,
G011 23/22, H01h 47/00
[50] Field of Search ............................................ 307/236,
130; 317/150, 123, 148.5, 123 D; 318/20.441

[56] References Cited
UNITED STATES PATENTS

| 3,383,904 | 4/1968 | Jones et al. ................... | 73/35 |
| 3,456,493 | 7/1969 | Roddick ....................... | 73/35 |
| 3,503,722 | 3/1970 | Weber et al. ................. | 73/35 X |
| 3,391,317 | 7/1968 | Bell .............................. | 318/18 |

*Primary Examiner*—D. X. Sliney
*Assistant Examiner*—Ulysses Weldon
*Attorney*—Donald L. Johnson ABSTRACT: Automatic gasoline antiknock measuring control that delivers compensating action roughly proportioned to knock intensity departure from standard, the action being continued so long as departure from standard increases at a rate at least as high as a predetermined minimum rate. Compensating action can be used to adjust compression ratio of knock-testing engine, or adjust blending of knock-reducing ingredient into gasoline. Dependable operation is obtained by having all solid-state components with differential amplification doing the error-detection sensing. Control can have a pair of all solid-state operational differential amplifiers with their inputs crossconnected and a dead band bias circuit also connected to these inputs, the set point source having a capacitor connected for charging by a selected voltage and for applying the capacitor voltage through a voltage follower to a comparison input of the amplifiers, the outputs being connected to raise the capacitor-charging voltage when the signals measured are too high and lower the capacitor-charging voltage when the signals are too low.

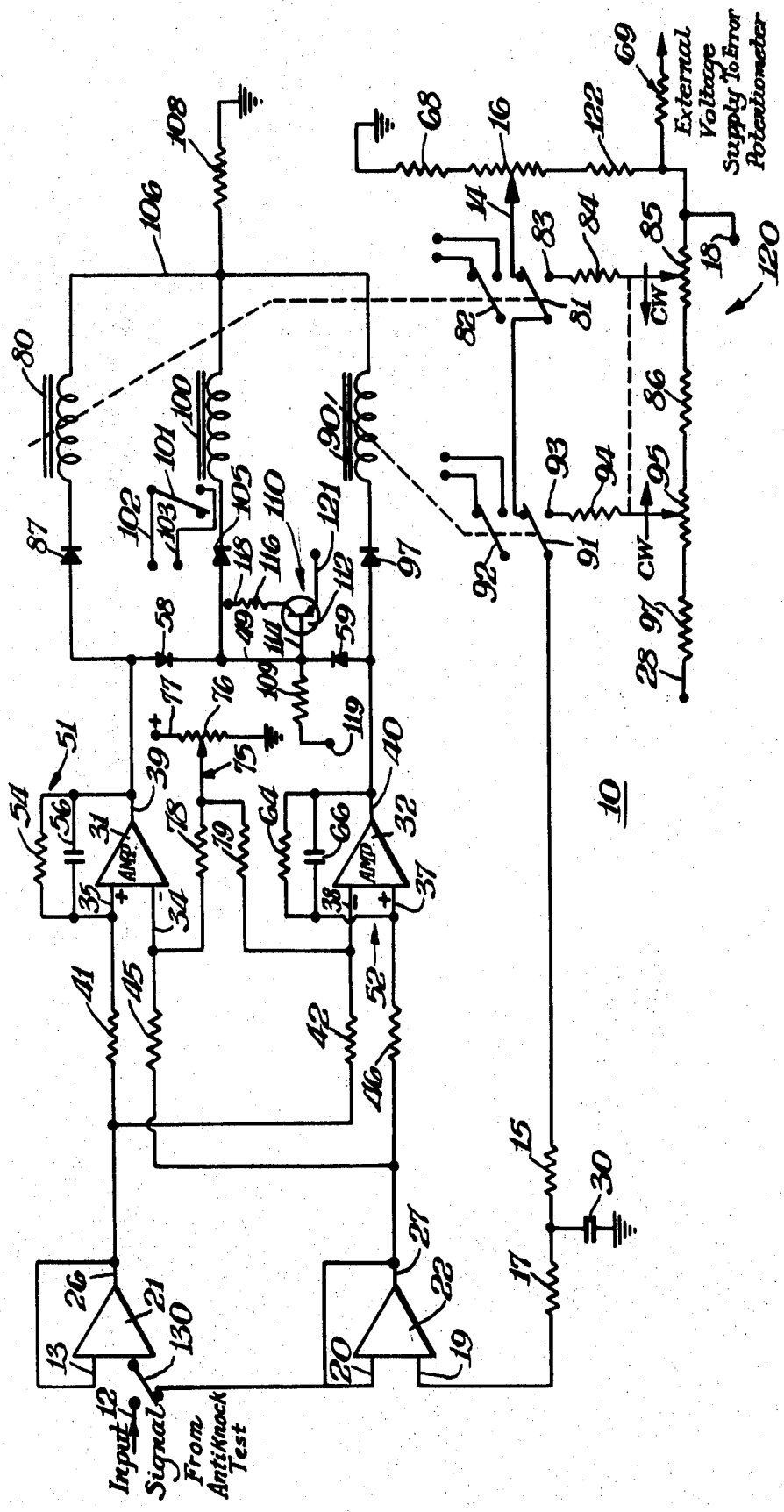

CONTROL APPARATUS

The present invention relates to control apparatus, particularly for automatically adjusting detonation knock intensity measurements as in the automatic measuring of antiknock ratings or in the automatic blending 7, gasoline, or the like. Such automatic measuring and automatic blending is described in U.S. Pat. applications Ser. Nos. 617,754 filed Jan. 24, 1967 which has become Pat. 3,488,598 granted Dec. 23, 1969, and Ser. No. 614,469 filed Feb. 7, 1967 which has since been abandoned.

Among the objects of the present invention is the provision of improved control apparatus of the above kind.

This as well as additional objects of the present invention will be more fully understood from the following description of several of its exemplification, reference being made to the accompanying drawing in which the single figure is a circuit diagram of one form of control apparatus representative of the present invention.

According to the present invention an automatic antiknock control for adjusting detonation knock intensity so as to maintain it approximately constant, is connected to make a compensating adjustment roughly in proportion to the difference between the measurement and a standard, and the control is further connected to continue a compensating adjustment so long as such difference increases at a rate at least as high as a predetermined minimum.

The control of the present invention can also have a dead band centered at standard knock intensity, in which band no compensating adjustment is effected.

The construction of the figure is that of an all solid-state control 10 that receives an input signal at lead 12 and compares it with a standard taken from the movable arm 14 of potentiometer 16. The input signal can for example be in the range of 0 to +10 volts DC and the potentiometer 16 can be supplied from a source 18 of positive DC voltage that can be somewhat higher than 10 volts. The negative terminal of the DC source can be grounded as well as the negative terminal of the signal source. The signal can be taken from a detonation pickup of a standard octane rating engine or from the knockmeter of such an engine as described in patent application Ser. No. 617,754. The knockmeter merely delivers an amplified and rectified counterpart of the detonation pickup signal.

Input lead 12 is one input terminal of an operational amplifier 21 connected in the noninverting fashion, which amplifier has another input lead 13 tied to its output lead 26 so that the amplifier acts as a differential follower. This circuit is characterized by its high-input and low-output impedance. The standard or reference voltage from potentiometer arm 14 is connected in series through relay armatures 81, 91 to input lead 19 of a second operational amplifier 22. This amplifier has its companion input 20 also tied to its output 27 in the same manner as amplifier 21. Before the reference standard voltage reaches input lead 19, it also passes through two series-connected resistors 15, 17 and charges up a capacitor 30 bridged between ground and the common connection of these two resistors.

Output leads 26, 27 of the respective amplifiers 21, 22 are connected to the inputs of two additional amplifiers 31, 32 which do the comparing of the present invention. Each amplifier 31, 32 can be of the type shown on page 27 of the Sept. 1966 issue of Electronic Products, for example, with a pair of input leads 34, 35 and 37, 38 respectively. Leads 35 and 38 are shown as connected together through separate resistances 41, 42 to receive signals from output 26 of amplifier 21. Similarly input leads 34, 37 of amplifiers 31, 32 respectively are connected together through separate resistances 45, 46 to output lead 27 of amplifier 22.

Amplifier 31 has its output lead 39 coupled through a feedback circuit 51 including a resistor 54, to its input lead 35. A capacitor 56 is directly bridged between output 39 and input 35 to prevent oscillation. A similar feedback circuit including resistor 64 and capacitor 66 is connected between output lead 40 and input lead 37 of amplifier 32. Amplifiers 31, 32 can also be used to compare the input signal or the standard with other references, as by supplying additional input connections to leads 35, 37.

Amplifier 31 is arranged to provide a negative voltage at its output lead 39 so long as the voltage at its input 35 is below the voltage at its input 34, but to shift to a positive voltage at its output lead 39 when input lead 35 is more positive than input lead 34 by an amount equal to or greater than one-half of the dead band voltage spread. Amplifier 32 is arranged to operate in a similar way giving a negative output when its input 37 is negative with respect to input 38 and a positive output when the reverse is true. A dead band is provided by biasing leads 34, 38 to a more positive voltage as by means of the bias circuit 75 having a potentiometer 76 supplied from a source of biasing potential 77, a selectable portion of which is delivered through separate resistors 78, 79 to the input leads 34, 38. A signal input from the detonation pickup or detonation knockmeter can also be offset as by inserting a resistor in series in lead 35 between resistor 41 and the input of amplifier 31 and supplying the inserted resistor with a suitably polarized voltage which is to be added to the input signal.

Three relays 80, 90 and 100 are connected to output leads 39, 40 of the comparing amplifiers. Relay 80 has its winding connected through diode 87 directly to lead 39. Similarly the winding of relay 90 is connected through diode 97 to lead 40. Diodes 87, 97 are each arranged to polarize the windings of their relays so that only positive outputs of the respective comparing amplifiers energize the respective relays. A common return circuit 106 for the relay windings is connected to ground through return resistor 108. The winding of relay 100 is connected between return lead 106 and a common output 49 which in turn is connected through diodes 58, 59 between output terminals 39 and 50. An additional diode 105 in series with the winding of relay 100 can be used to assure that this relay is polarized in the same way as relays 80 and 90.

Diodes 58, 59 arranged to permit positive outputs from the respective terminals 39, 40 to pass through to common output lead 49 and from there through the winding of relay 100. In this arrangement when only one of the outputs 39, 40 is positive and the other is negative, there is enough current flow through the winding of relay 100 to actuate it. This allows relay 100 to be actuated when either relay 80 or relay 90 is actuated; thus relay 100 can be said to provide an "or" output logic.

The illustrated construction is also provided with an indicator 110 shown as including a transistor 112 whose base is connected by lead 114 to common output lead 49, whose collector is connected through resistor 116 to a source of negative energizing voltage 118, and whose emitter is tied to an indicating lead 121. When either or both amplifier outputs 39, 40 are positive the common output lead 49 is rendered sufficiently positive to produce a negative signal on lead 121 in a "nor" logic system. Connecting common output lead 49 to a source 119 of negative voltage through current-limiting resistor 109 helps with such operation.

Relay 100 has an armature 101 which also acts as an indicator by closing a circuit between leads 103, 102 when this relay is energized.

Relay 80 is provided with two armatures 81, 82, the latter of which also acts as an indicator in a similar way. Armature 82 acts in addition as a control operator as by including it in a circuit that causes energization of an electric motor that changes the compression ratio of a gasoline-testing engine when relay 80 is energized. In place of or in addition to effecting such a compression ratio change, armature 82 can be connected to actuate an electric or air motor that changes the setting of a blending valve through which a knock-resisting additive is blended into a gasoline stream. Typical control arrangements of these types are described in application Ser. Nos. 617,754 and 377,192 filed June 23, 1964.

Armature 81 supplies the standard voltage to input lead 19 as explained above, when relay 80 is not energized. When the relay is energized armature 81 is pulled away from the circuit supplying the selected standard voltage, and pulled over to engage contact 83 connected through a resistor 84 to the arm of a potentiometer 85 in a voltage divider circuit 120. This voltage divider circuit can be energized by the same source 18 used to supply the standard voltage, but with an isolating resistance 122 inserted between potentiometer 85 and standard selecting potentiometer 16.

Relay 90 also has two armatures 91, 92, the latter acting as an indicator and control in the same manner as armature 82. Armature 91 which acts as a connector for the standard voltage supply when relay 90 is not energized, opens the standard supply circuit when such energization takes place, and then engages contact 93 which is connected through resistor 94 to a potentiometer 95 in the voltage-dropping bridge 120. The voltage-dropping bridge 120 is connected between positive source 18 and a negative source 28 to allow for correction potentials applied to resistors 84 and 94 to be higher or lower than the reference potential set by potentiometer 16. Potentiometers 85, 95 are shown connected as a dual potentiometer so as to bring toward or away from each other the potentials delivered to resistors 84 and 94 and to do this simultaneously and evenly. The further apart the potentials to 84 and 94, the longer is the "on" time of either relay 80 and 90, and thus the longer the correction pulse for the compression control motor.

The illustrated construction also includes a voltage tapoff 69 including an isolating resistor to energize an error potentiometer that provides the knock intensity signals for example.

In use all the power sources are connected including those to the amplifiers 21, 22, 31, 32. The energizing sources for these amplifiers are not illustrated in the drawing. Input lead 12 is connected to the desired source of input signal, and potentiometer 16 has its arm set to the position that provides the desired standard voltage. The potentiometer can be provided with a scale for this purpose calibrated by voltage and/or knock intensity.

The test engine from which the signal is supplied to input lead 12, is operated with gasoline to be tested, for example. A knock intensity of too low a level produced during such operation will cause differential amplifier 32 to shift from negative to positive output, actuating relay 90 and causing its armature 92 to effect an increase in compression ratio of the test engine. At the same time armature 91 is actuated, interrupting the delivery of standard voltage to lead 19 and substituting the lower voltage selected by the arm of potentiometer 95. Capacitor 30, which had been charged to standard voltage, thus begins to discharge through resistors 15 and 94, and this discharge will continue until the voltage at lead 19 is about the same as that of lead 12. At this point the output of amplifier 32 will return to the negative polarity, deenergizing relay 90. This returns the circuit to neutral condition.

Should the signal supplied to input lead 12 be falling in amplitude, the foregoing control action will take place but the return to neutral condition will be delayed because the capacitor 30 will have to discharge a little longer to reach a balanced condition. If the rate at which the input signal 12 falls is at least as great as the rate at which the capacitor discharges, the control action will be prolonged throughout the period during which such rate of signal drop is in effect.

A similar control action takes place in the opposite direction when the level of the input signal at lead 12 is higher than that of the standard, except that here the capacitor 30 is being charged (through the tap of potentiometer 85) rather than discharged. Corresponding control action will also increase or decrease the proportion of antiknock additive blended into gasoline so as to keep the knock intensity of the test engine at an approximately constant valve even though its compression ratio is not changed.

Inasmuch as small changes in knock ratings are accompanied by relatively large changes in knock intensities, the provision of a dead band in which no control correction is made, does not detract significantly from the accuracy of the control operation. Quite the contrary, a dead band of this type greatly reduces the hunting that the control would otherwise go through.

As an extra precaution the control armatures 82, 92 can be connected to operate a control motor one at a time, as by means of the cross-connected relays described in FIG. 3 of application Ser. No. 617,754.

The control action in accordance with the present invention is particularly rapid and effective. Thus in the automatic measurement of octane ratings it effects a decrease of about 10 percent in the time needed generally to complete a measurement when the control apparatus has the following construction:

| | |
|---|---|
| Amplifier 21 | Analog Devices Model 102 |
| Amplifier 22 | Analog Devices Model 102 |
| Amplifier 31 | Analog Devices Model 102 |
| Amplifier 32 | Analog Devices Model 102 |
| Resistor 41 | 40.2 k. ohms |
| Resistor 42 | 40.2 k. ohms |
| Resistor 45 | 40.2 k. ohms |
| Resistor 46 | 40.2 k. ohms |
| Resistor 54 | 62 megohms |
| Resistor 64 | 62 megohms |
| Capacitor 56 | 20 picofarads |
| Capacitor 66 | 20 picofarads |
| Capacitor 30 | 2.2 microfarads (tantalum) |
| Diode 58 | 1N2069 |
| Diode 59 | 1N2069 |
| Diode 83 | 1N2069 |
| Diode 93 | 1N2069 |
| Diode 105 | 1N2069 |
| Resistor 15 | 2.2 megohms |
| Resistor 17 | 1.0 k. ohms |
| Resistor 16 | 2.0 k. ohms potentiometer |
| Resistor 68 | 1.5 k. ohms |
| Resistor 122 | 5.6 k. ohms |
| Resistor 69 | 1.5 Kohms |
| Resistor 85 | 10 k. ohms (dual) potentiometer |
| Resistor 86 | 4.7 k. ohms |
| Resistor 95 | 10 k. ohms (dual) potentiometer |
| Resistor 97 | 15 k. ohms |
| Resistor 84 | 4.7 megohms |
| Resistor 94 | 4.7 megohms |
| Resistor 108 | 150 ohms |
| Resistor 109 | 2.0 k. ohms |
| Resistor 76 | 2.0 k. ohms potentiometer |
| Resistor 78 | 680 k. ohms |
| Resistor 79 | 680 k. ohms |
| Power Supply 18 | +18 volts |
| Power Supply 77 | +18 volts |
| Power Supply 118 | −18 volts |
| Power Supply 119 | −18 volts |
| Power Supply 28 | −18 volts |
| Relay 80 pull-in current | 10 milliamperes DC |
| Relay 90 pull-in current | 10 milliamperes DC |
| Relay 100 pull-in current | 10 milliamperes DC |

Where the comparing amplifiers 31, 32 having their inputs internally biased, as to compensate for internal offset, it is preferred to have those inputs fed from signal supplies of opposite bias polarity. In other words, where input 35 is internally biased positive with respect to input 34, then input 38 should have a negative internal bias with respect to input 37.

Even further measuring time savings are obtained where the measurement involves substantial changes in compression ratio, as when testing a gasoline having an octane rating sharply different from the last gasoline tested.

Blending control in accordance with the present invention is also improved, particularly where there is a process upset and the blending proportion has to be given a very sharp adjustment.

The control apparatus of the present invention can use a single differential amplifier to do the comparing, in place of the two balanced comparing amplifiers of the figure. However, the balanced pair is more stable and more dependable for protracted operation without maintenance, particularly where these amplifiers are of the solid-state type. Vacuum tube amplifiers generally require too much maintenance.

With comparisons made by a single differential amplifier, the control action can be arranged to follow the polarity of the amplifier's output—a negative output actuating one polarized relay and a positive output an oppositely polarized relay.

The follower amplifier 22 assures the decoupling of the comparison inputs from the set point signals at lead 19, so that these signals are not affected by control action. The other follower amplifier 21 is not needed where the incoming test signals at lead 12 are of sufficiently low impedance. Both followers together assure comparisons are made on signals supplied with the same source impedance, but this is a minor refinement.

The figure of the drawing also shows a standby switch 130 that for standby operation disconnects the input of follower amplifier 21 from the input lead 12 and connects it instead to the output 27 of follower amplifier 22. This stops the control action without permitting capacitor 30 to change its voltage. Accordingly the control operation can be resumed instantaneously by merely throwing switch 130 back to the position in which connects amplifier 21 to input lead 12.

A feature of the present invention is that only one dual carefully regulated power supply is needed to provide extremely accurate control operation. Thus power supply 28, 18 is the only really critical power supply of the apparatus and should supply a voltage constant to within about ±0.5 percent. Power supply 18, 28 can also be used to energize all the amplifiers and to supply the power to power supplies 77, 118, 119 inasmuch as separate supplies are not needed for these functions.

A consolidated power supply can also be arranged to have an intermediate ground, so that it supplies both positive and negative requirements with respect to ground.

The amplifiers can alternatively be operated by power supplies having one end grounded. With such energization the amplifier outputs will shift between high and low levels of the same polarity, and the relays can then be arranged to respond only to the high-level outputs.

One of the power supplies such as 18 can also be arranged to supply power for obtaining the error signal to be delivered to input lead 12. As illustrated, an error potentiometer which may be a retransmitting slide-wire mechanically driven by a recorder or servo voltmeter that measures the knock intensity signal, can be supplied from source 18 through isolating resistor 69. Such use of a common power supply for the input signal to 12 and the reference signal to 19 makes for more dependable operation.

Obviously many modifications and variations of the present invention are possible in the light of the above teachings. It is, therefore, to be understood that within the scope of the appended claims the invention may be practiced otherwise than as specifically described.

What is claimed:

1. In an automatic antiknock control having comparing means, knock intensity measuring means that delivers to said comparing means a measurement signal corresponding to the intensity of the measure knock, a standard signal source that delivers to said comparing means a standard signal with which the measurement signal is compared, and a compensator connected to said comparating means to make a compensating adjustment roughly in proportion to the difference between the measurement signal and the standard signal, the improvement according to which the compensator further includes shift means connected to the standard signal source to automatically vary the standard signal when making a compensating adjustment, such varying being in the direction that reduces the difference between the measurement signal and standard signal, to cause a compensating adjustment to continue at least as long as the measurement signal continues to depart from the original standard signal at a rate at least as high as the rate the standard signal is automatically varied.

2. The combination of claim 1 in which the control has a dead band centered on the standard signal, in which band no compensating adjustment is effected.

3. The combination of claim 2 in which differential amplification means is connected to compare the measured signal with the standard signal, and the dead band is provided by an adjustable parallel bias means for the differential amplification means.

4. The combination of claim 1 in which the compensator is connected to change the compression ratio of a knock-testing engine.

5. The combination of claim 1 in which the compensator is connected to control a blender for changing the proportion of knock-reducing ingredient added to a stream of the gasoline whose knock intensity is measured.

6. The combination of claim 1 in which the standard signal source has a capacitor connected for charging by a selected set point voltage, the control has (a) a pair of all solid-state operational differential amplifiers with their inputs cross-connected to the knock intensity measuring means and to the standard signal source, (b) a dead band bias circuit is also connected to these inputs, and (c) means including a solid-state voltage follower for applying the voltage of the capacitor to one of the comparison inputs of the differential amplifiers, and the compensator includes voltage-changing means connected to respond to the outputs of the differential amplifiers and to the standard signal source to change the voltage applied to the capacitor in the direction that causes compensating action to be longer the farther away the measured knock intensity is from the dead band and the smaller its rate of return.

7. The combination of claim 6 in which the control also includes a standby connection for supplying to the other comparison input of the amplifiers the voltage at the output of the voltage follower.

8. In a control determining when a variable signal is displaced from a set point and applying a corrective action, the improvement according to which the control has a pair of all solid-state operational differential amplifiers with their inputs cross-connected and a dead band bias circuit also connected to these inputs, set point means for supplying a selected set point voltage to one of the cross-connected pairs of inputs by way of an all solid-state voltage follower, the outputs of the differential amplifiers are connected to effect one corrective action when the variable signal is on one side of dead band and a different corrective action when the variable signal is on the other side of the dead band, and compensating means connected to said outputs and to the set point means to vary the set point voltage during corrective action and to effect such varying in the direction that would reduce the corrective action, to cause the corrective action to be longer the farther away the signal is from the dead band and the smaller its rate of correction.

9. The combination of claim 8 in which the set point means includes a capacitor connected for charging to the set point voltage, and the control also includes a standby connection for supplying to the other cross-connected pairs of inputs the voltage developed at the output of the voltage follower.